United States Patent [19]
Eccles

[11] 4,032,757
[45] June 28, 1977

[54] CONTROL APPARATUS

[75] Inventor: Edward Stuart Eccles, Bishops Cleeve, near Cheltenham, England

[73] Assignee: Smiths Industries Limited, London, England

[22] Filed: Sept. 19, 1974

[21] Appl. No.: 507,514

[30] Foreign Application Priority Data

Sept. 24, 1973 United Kingdom ............ 44636/73

[52] U.S. Cl. ..................... 235/150.2; 235/153 AE; 318/564
[51] Int. Cl.² .................. G06F 15/46; G06F 11/08
[58] Field of Search ............ 235/150.2, 151, 151.1, 235/153 AE; 60/39.28; 340/197 SC; 318/580, 655, 8, 13, 564, 565; 244/77 M

[56] References Cited

UNITED STATES PATENTS

| | | | |
|---|---|---|---|
| 3,143,693 | 8/1964 | Fearnside et al. | 318/580 |
| 3,476,922 | 4/1969 | Yiotis | 235/153 AE |
| 3,517,174 | 6/1970 | Ossfeldt | 235/153 AE |
| 3,679,956 | 7/1972 | Redmond | 318/13 |
| 3,688,099 | 8/1972 | Buscher | 235/153 AE |
| 3,829,668 | 8/1974 | Noumi et al. | 235/153 AE |
| 3,834,361 | 10/1974 | Keely | 60/39.28 |

OTHER PUBLICATIONS

Auricoste et al: Digital Computers Monitor Nuclear Steam Generator, Control Engineering vol. 8; No. 3. Mar. 1961, pp. 127–131.

*Primary Examiner*—Jerry Smith
*Attorney, Agent, or Firm*—Pollock, Vande Sande & Priddy

[57] ABSTRACT

Control apparatus for controlling an aircraft gas-turbine engine, having two control lanes operated in parallel with one another and each of which is capable of performing the function of the control apparatus individually, includes a computer and a monitor unit associated with each lane for performing checks on the integrity of the components of both lanes. Transducers in each lane sense engine parameter values and pass signals in accordance therewith to the computer that sends control signals to a control unit and thence to an actuator for adjusting engine variables in accordance with engine-thrust requirements. The control unit includes a pair of cam-operated switches that respond to difference in the values of the control signal from each lane indicative of a fault in the lanes and that trigger operation of the monitor unit in each lane. The monitor units disengage the control signals of the computers from the actuator and cause each computer to pass to the monitors the results of signal comparisons it has made involving signals values of each lane, so that the monitor units can determine in which lane the fault lies. The monitor units reconnect to the actuator control signals from a lane that is found to be operating correctly.

8 Claims, 8 Drawing Figures

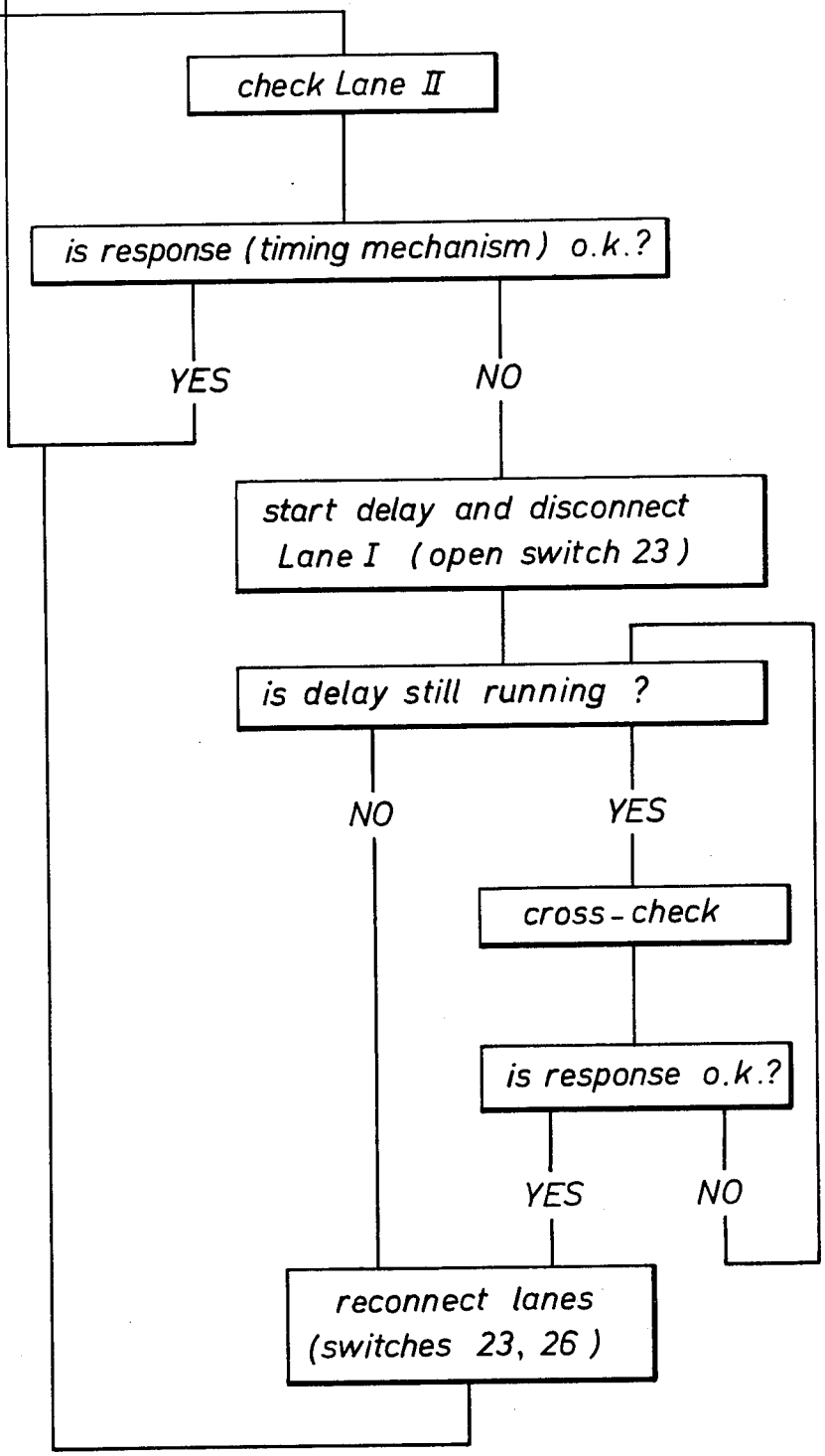

CONTROL APPARATUS

This invention relates to control apparatus.

The invention relates especially, though not exclusively, to apparatus for controlling gas-turbine engines as used in aircraft, and in this respect is concerned especially with the provision of duplex control apparatus.

Duplex control apparatus involves essentially two (normally identical) control channels, or lanes, each of which is capable of performing the function of the control apparatus individually. The lanes are operated in parallel with one another so as to ensure a degree of redundancy that enables checks to be carried out on the integrity of the control exercised by the apparatus. Signals from corresponding stages in the two lanes are compared, and detection of a difference between two such signals is interpreted by the monitor units as indicative of the existence of a fault. However, since the monitor units are not capable of identifying which one of the two signals is the faulty one, neither of the lanes can be allowed to remain in control. Thus, although there is redundancy in the control apparatus in that two control lanes are provided to perform the function that could be carried out by either one of them, control cannot be maintained subsequent to a single fault being detected in the two lanes.

It is one of the objects of the present invention to provide control apparatus which whilst having a single level of redundancy is capable of maintaining control subsequent to the occurrence of a fault.

According to the present invention, there is provided control apparatus having at least two control lanes each of which is for providing control signals, the lanes being operated in parallel with one another, means for detecting existence of a fault in the lanes by cross-checking between them, and means responsive to the detection of a fault for performing in respect of each individual lane a predetermined operation of signal comparison involving signal values from that lane so as to determine the lane in which the fault lies.

Apparatus according to the present invention, and for exercising control in relation to five parameters of a gas-turbine aircraft engine that has an afterburner, will now be described, by way of example, with reference to the accompanying drawings, in which.

Figure 1:
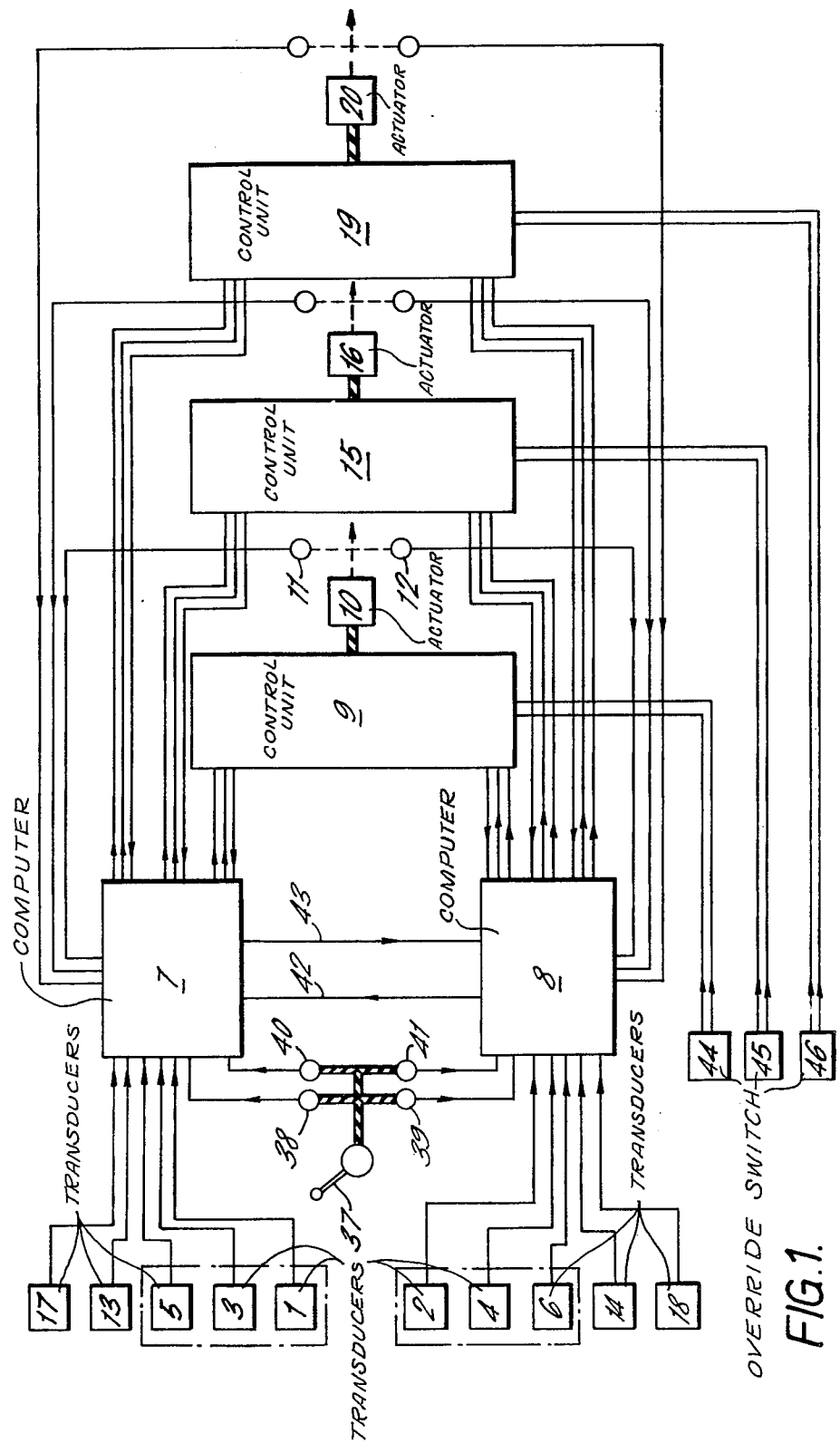
FIG. 1 shows the apparatus in schematic form.

The control apparatus shown in the drawings, and its method of operation will be described with reference to the temperature of the exhaust gas of the engine, the gas pressure within the combustion chamber, the speed of the turbine shaft, the 'position' (that is to say, the effective area) of the exhaust nozzle, and the fuel flow to the afterburner. The first three parameters are mutually dependent, and so are adjusted in value by a single actuator, whilst separate actuators are used for the remaining two parameters.

Referring to FIG. 1, six transducers 1 to 6 are associated with the engine to supply appropriate electric input signals to computers 7 and 8 for control in relation to the three mutually-dependent parameters. More specifically, the transducers 1 and 2, which are provided by temperature sensing probes located on the engine, derive nominally-identical signals in accordance with the exhaust-gas temperature, whereas the transducers 3 and 4 are provided by pressure sensors that derive nominally-identical signals in accordance with the gas pressure within the combustion chamber. The transducers 5 and 6 are speed-responsive devices which are located at the turbine stage of the engine and derive nominally-identical signals in accordance with the speed of rotation of the turbine shaft. The signals derived by the transducers 1, 3 and 5 are supplied to the computer 7, whereas the nominally-identical set of signals derived by the transducers 2, 4 and 6 are supplied to the computer 8, to enable both computers 7 and 8 to carry out an analysis. The analysis determines whether adjustment of any of the parameter values is necessary, and each computer 7 and 8 supplies a signal dependent on the adjustment required to a unit 9 which controls an actuator 10.

The actuator 10 is a hydromechanical device that controls the setting of a valve (not shown) which regulates fuel flow to the engine. Two mechanical-to-electrical transducers 11 and 12 feed back to the computers 7 and 8 respectively signals in accordance with the setting of the fuel valve and thus in accordance with the instantaneous fuel flow to the engine.

A further pair of transducers 13 and 14 located on the engine provide nominally-identical signals in accordance with the 'position', more particularly the effective-area setting, of the exhaust nozzle of the engine. The signals from the transducers 13 and 14 are supplied to the computers 7 and 8 respectively which derive control signals in dependence thereon for application to a control unit 15. The control unit 15 controls an actuator 16 which regulates the setting of the 'position' of the exhaust nozzle.

A third pair of transducers 17 and 18, which are located on the engine to respond to fuel flow to the after-burner, supply to the computers 7 and 8 respectively nominally-identical signals in accordance with the flow rate. The computers 7 and 8 supply control signals in dependence upon these signals to a control unit 19 for control of an actuator 20 that regulates the fuel flow to the afterburner.

The apparatus thus controls the value of the three engine variables of fuel flow to the engine, 'position' of the exhaust nozzle of the engine, and fuel flow to the afterburner.

The control units 9, 15 and 19 are of the same basic construction as one another, and this construction will now be described in greater detail with reference to the unit 9. Details of construction of unit 9 are illustrated in FIG. 2.

Figure 2:
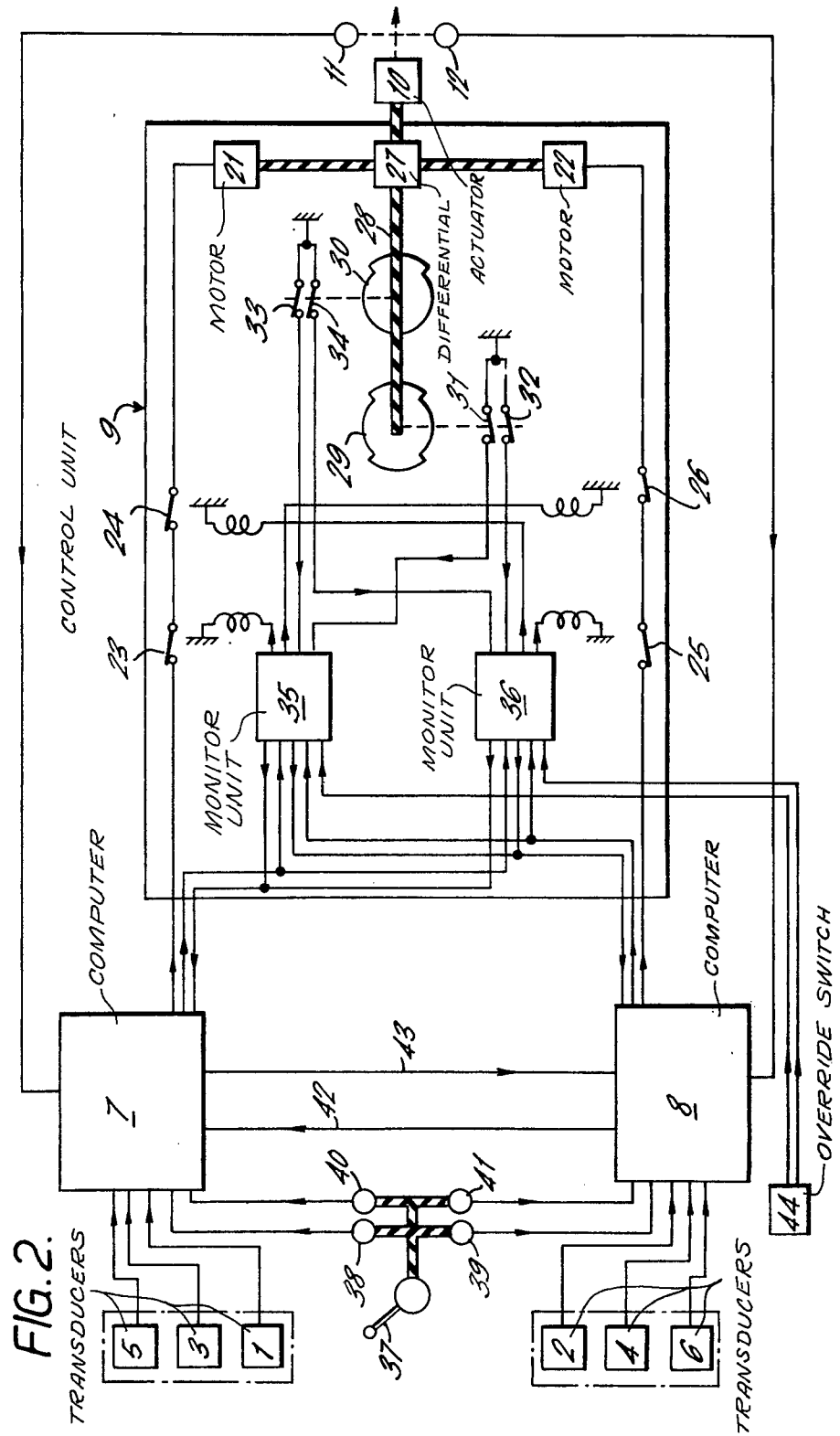
FIG. 2 shows in greater detail part of the apparatus of FIG. 1 for exercising control in relation to three of the engine parameters.

Referring to FIG. 2, the control signals supplied to the unit 9 by the computers 7 and 8 are applied to electric motors 21 and 22, the signal from the computer 7 being applied to the motor 21 via serially-connected switches 23 and 24 and that from the computer 8 being applied to the motor 22 via corresponding switches 25 and 26. The motors 21 and 22 drive respective input shafts of a differential gearbox 27 which in its turn drives the actuator 1. The gearbox 27 drives the actuator 10 in accordance with the sum of the input-shaft rotations from the motors 21 and 22, and also rotates a shaft 28 in accordance with any difference between those input-shaft rotations.

The shaft 28 carries two cams 29 and 30 that are associated with a pair of switches 31 and 32 and a pair of switches 33 and 34, respectively. The switches 31 and 32 are normally closed but are both opened by the cam 29 when the shaft 28 rotates in either sense through more than a predetermined threshold angle. The switches 33 and 34, which are also normally closed, are on the other hand opened by the cam 30 only when the shaft 28 passes through the threshold angle in one of the two rotational senses. The switches 31 and 33 are connected to a monitor unit 35 and the switches 32 and 34 are connected to an identical monitor unit 36 of the control unit 9. Both monitor units 35 and 36 are connected to both computers 7 and 8, and serve to monitor operation of the two nominally-identical lanes controlling the actuator 10, that is to say the lane, Lane I, which comprises the transducers 1, 3 and 5, computer 7, switches 23 and 24 and motor 21, and Lane II, which comprises the transducers 2, 4 and 6, computer 8, switches 25 and 26 and motor 22. Each lane is in itself capable of effecting the required control independently of the other, but in the absence of a fault condition affecting the operation of one of them, both are employed in the control function at all times.

The control lanes are supplied with command signals that determine the required values of the engine parameters from a lever 37 that is manually operated by the pilot in accordance with the thrust required of the engine. Two mechanical-to-electrical transducers 38 and 39 sense the setting of the lever 37 when the value of the thrust demanded is towards the higher end of its range, and pass signals indicative of this setting to the computers 7 and 8 respectively. Two transducers 40 and 41 carry out analogous functions to those of transducers 38 and 39 respectively, when the value of the thrust demanded is towards the lower end of its range. The ranges of operation of the two pairs of transducers overlap one another, but each pair is especially sensitive to settings of the lever 37 within the relevant higher or lower engine-thrust range. The computers 7 and 8 determine from the thrust demanded by the setting of the lever 37 the required values of the five parameters controlled by the apparatus, and thus, by analysis, whether adjustment of their values is required.

The operation of the computers 7 and 8 with each pair of transducers and their associated control unit and actuator is the same for all five control functions, and, as an example, this operation will now be described with reference to the interlinked parameters of temperature of the exhaust gases within the jet-pipe, combustion chamber pressure, and turbine shaft speed, that is to say, the operation of the system will be described with reference to that of Lanes I and II involving the control unit 9 and actuator 10.

Figure 3:
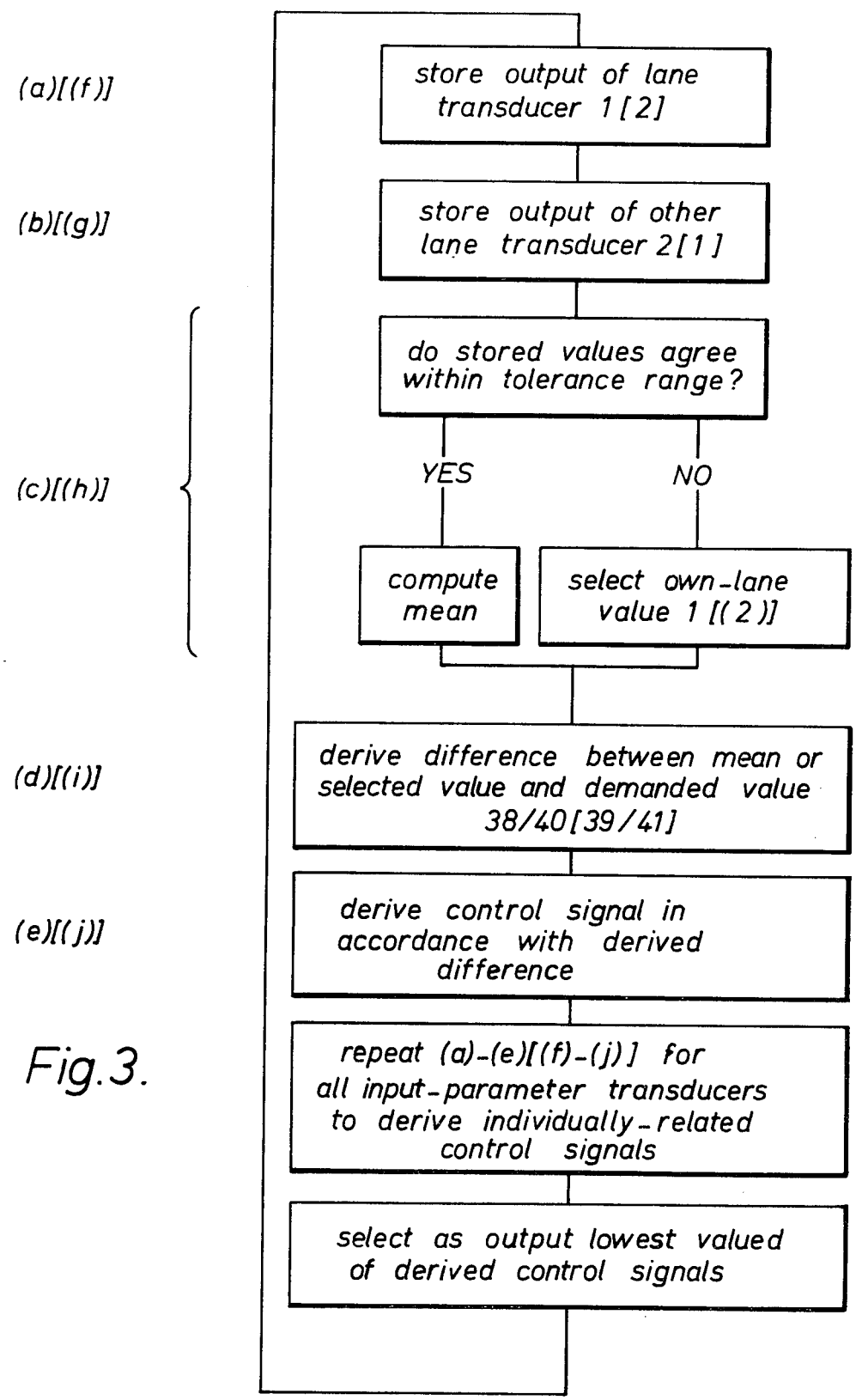
FIGS. 3 and 4 are illustrative of control and check programs respectively, performed by two computers of the control apparatus of FIGS. 1 and 2.
Figure 4:
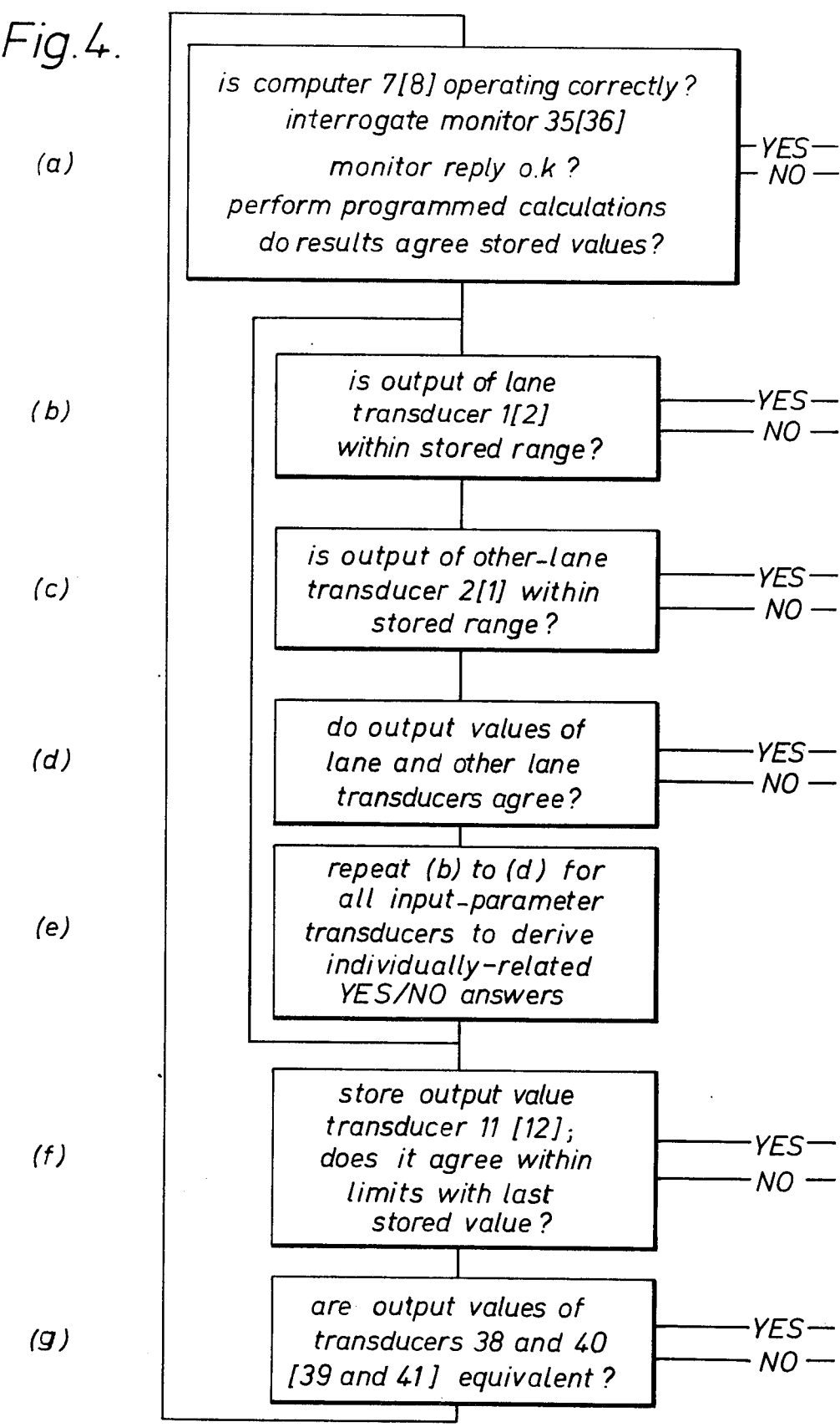

The computers 7 and 8 perform two functions concurrently, the one being to carry out a control program, illustrated in FIG. 3, for controlling the actuator 10, and the other being to carry out a check program, illustrated in FIG. 4, for detecting a fault within the control apparatus. Paths 42 and 43 interconnect the computers 7 and 8 so that information for performing the control and check programs can be exchanged between them. It is necessary to convert the outputs from the transducers 1 to 6 which are in analogue form, into digital form for use in the digital computers 7 and 8, and, to this end, an analogue-to-digital converter forms part of the input of each computer.

Each computer 7 and 8 carries out its own control program repeatedly, and supplies output control signals in accordance therewith unless interrupted by a signal from the monitor units 35 and 36 indicating a fault, in which case the continuation of supply of output signals by the computers depends upon the results of their check programs. The control program performed by the computer 7 is illustrated in FIG. 3 (that performed by computer 8 is the same with the modifications signified by square brackets [ ] in the figure), and typically occupies a time period of thirty milliseconds. For convenience of explanation, this period can be split up into the following discrete steps (although, in practice, some or all of the steps may overlap one another):

Control program for computer 7 in relation to exhaust gas temperature:
  a. store the output signal arriving directly from transducer 1,
  b. store the output signal from transducer 2 arriving from computer 8 via the data-exchange path 42.
  c. compare the signals obtained in the preceding two steps and obtain a single corresponding value in digital form,
  d. compare the value of the digital signal obtained from the preceding step with the value required for the temperature of the exhaust gases as defined by the pilot's command lever 37 via transducer 38 (or 40), and determine the difference (if any) between these two values, and
  e. derive a signal in accordance with the difference obtained in the preceding step.

Control program for computer 8 in relation to exhaust gas temperature:
  f. store the output signal arriving directly from transducer 2,
  g. store the output signal from transducer 1 arriving from computer 7 via the data-exchange path 43,
  h. compare the signals obtained in the preceding two steps and obtain a single corresponding value in digital form,
  i. compare the value of the digital signal obtained from the preceding step with the value required for the temperature of the exhaust gases as defined by the pilot's command lever 37 via transducer 39 (or 41), and determine the difference (if any) between these two values, and
  j. derive a signal in accordance with the difference obtained in the preceding step.

The digital signals from steps (c) and (h) are obtained in accordance with the following rules:
  1. if the signals from the two preceding steps of the program agree to within a specified tolerance, then their mean value is used for the control calculations of steps (d) and (i) in both of the computers 7 and 8,
  2. if the signals from the two preceding steps do not agree to within the specified tolerance, the value of the digital signal used in step (d) is that obtained from step (a), (the signal from step (b) being ignored) and the value of the digital signal used in step (i) is that obtained from step (f), (the signal from step (g) being ignored); that is to say, the signal used for the control calculations in this case is the one derived from the transducer in the computer's own lane.

The comparisons made in steps (d) and (i) may be more complicated than indicated, in that previous values of the exhaust gas temperature, or a combination of these values with the values of the other parameters controlled, may also be involved.

Control programs involving steps corresponding to the above-mentioned steps (a) to (j) are carried out in the computers 7 and 8 in respect of the pressure within the combustion chamber and the speed of the turbine shaft, as sensed by the transducers 3 and 4 and 5 and 6. Three signals are thus derived by the computer 7, and the computer 7 determines which of the three would require the lowest fuel-flow setting of the actuator 10; it is the signal which is supplied as the control signal to the motor 21. The same process is undertaken by the computer 8 in respect of the three signals that are derived thereby, the signal selected being supplied as the control signal to the motor 22. (It should be noted that although in the present example the control signal is chosen as the one requiring the lowest fuel-flow rate to the engine, it is envisaged that the computers 7 and 8 may be programmed so as to select the control signal in accordance with some other criterion. For example, the control signal may be selected from the three derived signals as that signal which requires the least change in the fuel-flow rate to the engine).

The drives applied by the motors 21 and 22 to the separate inputs of the differential gearbox 27 are, in the absence of a fault in the apparatus, substantially equal, so that the output shaft 28 of the gearbox 27 driven in accordance with the difference between the inputs to the gearbox 27 does not rotate significantly. The difference shaft 28 rotates to operate the switches 31, 32, 33 and 34 only in response to a difference in the input drives to the gearbox 27 that exceeds a predetermined threshold value. Such rotation of the shaft 28 is indicative of a fault in the apparatus, and moves the cam 29 and so opens both switches 31 and 32. Cam 30 also rotates, and if the rotation is in a predetermined sense, for example clockwise, the switches 33 and 34 are opened. The switches 33 and 34 are not opened if the rotation of the shaft 28, and thus of the cam 30 is in the opposite sense. The direction of rotation of the shaft 28 is dependent on whichever one of the inputs to the gearbox 27 from the motors 21 and 22 is the larger.

Figure 5:
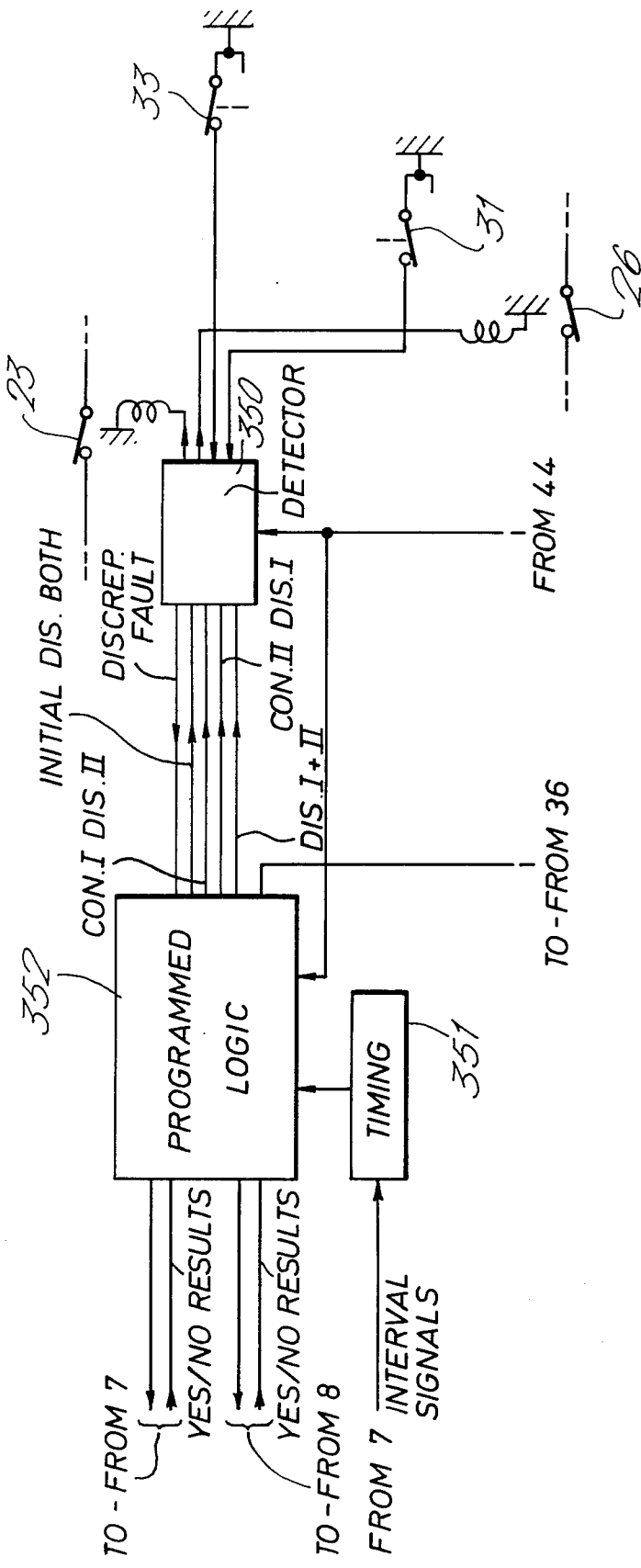
FIG. 5 is illustrative of the construction of one of two identical monitor units of the control apparatus of FIGS. 1 and 2.

The monitor units 35 and 36 detect the opening of the switches 31 and 32, and of switches 33 and 34 if these do open, and send signals to open the switches 23, 24 and 25, 26. The monitor unit 35, as illustrated in FIG. 5, includes a detector unit 350 to detect opening of either or both of switches 31 and 33, and to control the opening and closing of switches 23 to 26 to interrupt the supply of control signals to the actuator 10, in each lane; corresponding provision is made in the unit 36. Signals from the monitor units 35 and 36 are also sent to the computers 7 and 8, these signals being sent in accordance with the logic program of FIG. 6 (see FIG. 6A) from a programmed logic unit 352 coupled to the detector 350 in the monitor unit 35 (FIG. 5), and from a corresponding logic unit of the monitor unit 36. These signals indicate that a fault exists, and also which of the lanes is producing the higher control signal. The control programs of the computers 7 and 8 are interrupted, and they supply the results of their check programs to both monitor units 35 and 36.

Provision is made in the system so that short-lived transient faults, such as interruption of the power supply to one of the lanes, do not give rise to rotation of the shaft 28. To this end, a check is continually made by each monitor unit, as indicated in the logic program of FIG. 6 (see FIG. 6B), to see whether a control signal is being generated in the other lane. If it is found that the signal is absent, then the control signal from the lane that is functioning is delayed for a period of approximately two hundred milliseconds so that equal (zero) signals are passed to the motors 21 and 22, and the difference shaft 28, therefore, does not rotate, and switches 31, 32, 33 snd 34 remain closed. During this delay period, the cross-checking by the monitor units continues, and if the missing control signal reappears, for example due to resumption of power within that lane, then the control signals are re-connected to their respective motors 21 and 22 and the control system operates in its normal mode. However, even if the missing control signal has not been restored at the end of the delay period, the control signals are still re-connected to their respective motors. Since in this event there will be a significant difference between the two input drives to the gearbox 27, the shaft 28 will rotate, and, as described above, cause the results of the check programs in each computer 7 and 8 to be supplied to both monitor units 35 and 36.

The check program of computer 7, illustrated in FIG. 4, comprises the following steps:

a. check whether the computer 7 is operating correctly;

b. compare the output signal from transducer 1 with the operating range of the exhaust gas temperature that is stored in the computer 7;

c. compare the output signal from transducer 2, arriving via the data-exchange path 42, with the operating range of the exhaust gas temperature that is stored in the computer 7;

d. compare the output signal from the transducer 1 with the output signal from transducer 2, arriving via the data-exchange path 42;

e. make comparisons corresponding to those made in steps (b), (c) and (d) with respect to transducers 3 and 5 and also with respect to transducers 4 and 6;

f. compare the output signal from the transducer 11 associated with the actuator 10 with the transducer's output signal from the last control program of the computer 7; and g. compare the outputs of transducers 38 and 40.

Steps (b) and (c) of the check program of computer 7 may involve more complicated comparisons, such as those indicated for steps (d) and (i) of the control program.

The check (a) on the operation of the computer 7 is divided into two parts, the first part being to determine whether the computer is in fact working, and the second part being to determine whether it is working correctly. To this end, the monitor unit 35 is provided with its own timing mechanism 351, as shown in FIG. 5, and the computer 7 sends signals to the monitor unit 35 at predetermined intervals of time. If a certain number of such signals are not received by the mechanism 351 as the monitor 35 within a given time period, the logic unit 352 of the monitor unit 35 acting in accordance with the logic program illustrated in FIG. 6 (see FIG. 6B), interprets the cessation as failure of Lane I. If it is established that the computer 7 is working, the yes response (FIG. 6B) of the monitor 35 requests the computer 7 to perform, in accordance with the check program as illustrated in FIG. 4, predetermined calculations, and the results of these calculations are compared with the correct results which are stored in the computer 7. Faulty operation of the computer 7 would thus be indicated by these checks.

The check program of the computer 8 comprises steps analogous to the steps (a) to (g) of the check program of the computer 7.

Cross-checking between the monitor units 35 and 36 themselves serves to establish whether these components of the control system are functioning correctly.

The vast majority of faults within a transducer result in complete failure of the transducer, and this fact is taken into account when making the comparisons of steps (b), (c), (d) and (e) of the check program of computer 7, and the corresponding steps in the check program of computer 8. That is to say, the signal emitted by the transducer will usually either correspond to the actual value of the parameter it is detecting (within the manufacturing tolerance of the transducer), or be completely outside the operating range of that parameter.

A fault in one of the data-exchange links 42 and 43 would be indicated if both computers have been shown to be working correctly and if computer 7 indicates that transducers 1, 3 and 5 are operating correctly but that transducers 2, 4 and 6 are faulty, and computer 8 indicates that transducers 2, 4 and 6 are working correctly but that transducers 1, 3 and 5 are faulty.

If the comparisons of step (d) of the check program of computer 7 and the corresponding step for computer 8 indicate a significant difference between the transducer outputs, then if only a single fault exists in the system, it will have been isolated to that particular pair of transducers, thus simplifying the problem of identifying which of the lanes is faulty.

The comparison of step (g) for computer 7 and the corresponding step for the transducers 39 and 41 in the check program of computer 8 serve as guides to the integrity of the basic input information to the control system from the pilot's command lever 37.

The comparison of step (f) for computer 7 and the corresponding step for the transducer 12 of the check program of computer 8 serve to indicate whether the respective motors 21 and 22 did in fact move in response to the signals passed to them from the previous complete control program.

Therefore, as a result of the checking programs run by computers 7 and 8, each component of the control apparatus is tested for its efficient working.

Figure 6A:
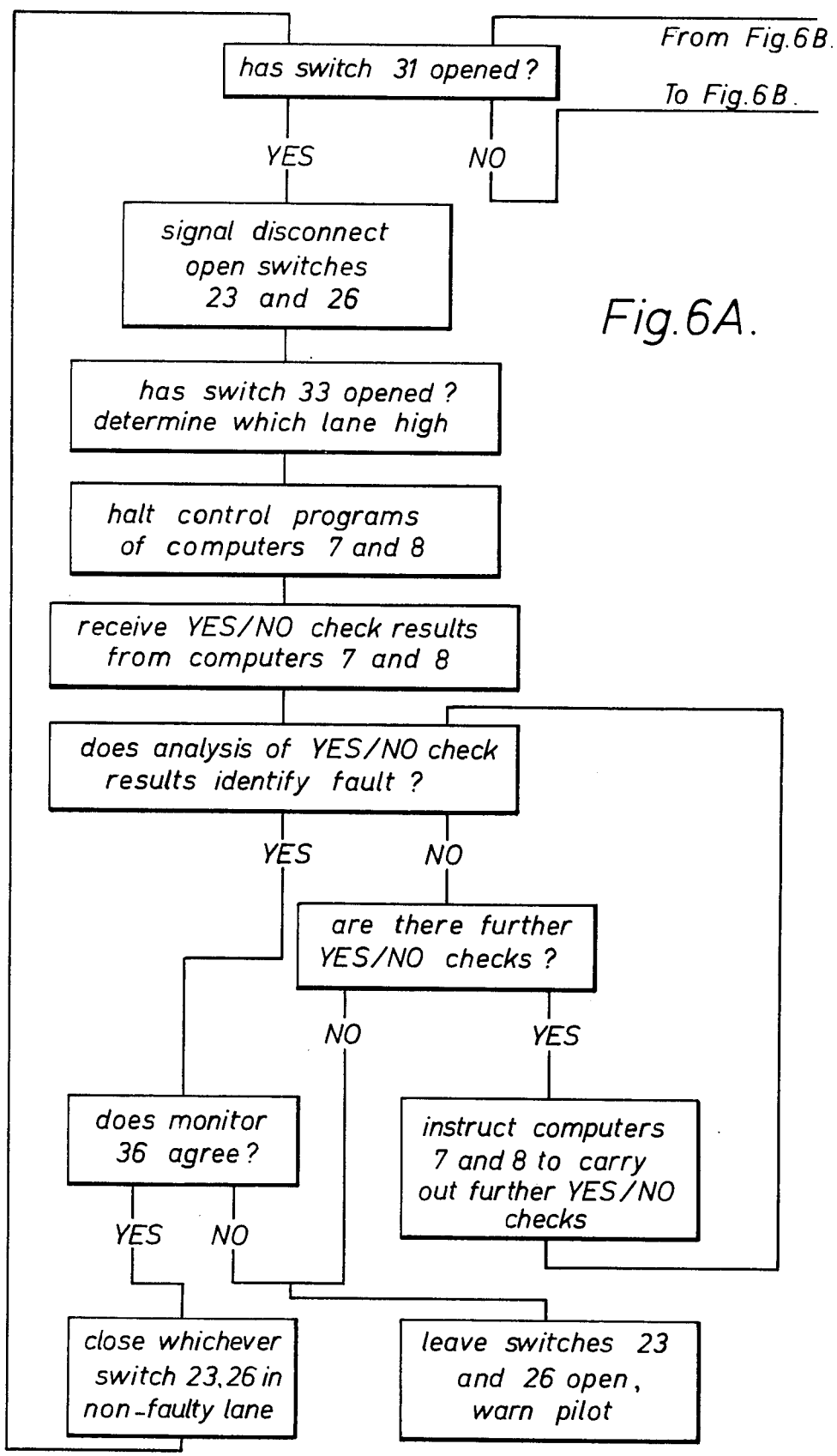
FIG. 6, which is divided into two parts 6A and 6B, is illustrative of a logic program performed by a logic unit of the monitor unit of FIG. 5.

If the above-mentioned checks do not locate the fault, additional checks as illustrated in FIG. 6 (see FIG. 6A) may be made, and the extent to which additional checks are made depends upon how essential it is that the apparatus should remains in automatic control of the engine. For example, if it has been shown that the outputs of all the transducers are within their respective operating ranges, then the transducers may be tested further by programming the computers 7 and 8 to carry out comparisons between the values of different parameters to determine, for example, whether the rate of change of a parameter is in excess of a predetermined value, or whether the indicated exhaust gas temperature is consistent with the indicated combustion chamber pressure and with the indicated turbine shaft speed.

The comparisons made to determine whether a particular component of the control apparatus is working correctly may be refined if required. For example, the computers 7 and 8 may be programmed such that the operating range with which the value of the parameter is compared is adjusted for different flight conditions of the aircraft.

The results of the above-mentioned checks are passed back from the computers 7 and 8 to each of the monitor units 35 and 36. The programmed logic unit 352 (operating in accordance with the logic program illustrated in FIG. 6) of monitor unit 35, and the corresponding logic unit of monitor unit 36 then decide automatically which of the following courses of action needs to be taken:

i. re-connect the apparatus of Lane I to the actuator 10, and leave control Lane II disconnected;
ii. re-connect the apparatus of Lane II to the actuator 10, and leave control Lane I disconnected;
iii. leave both the control lanes disconnected from the actuator 10.

The particular course of action taken depends on the extend of the agreement between the signals received by each monitor unit 35 and 36 from the check programs of the computers 7 and 8. However, there must be complete agreement between the monitor units 35 and 36 to take course (i) or course (ii), otherwise course (iii) is taken. An exception to this is where the fault has been located in one or other of the monitor units 35 and 36. In this case, signals from the lane containing the faulty monitor are ignored, and the monitor unit of the other lane decides whether its own lane should be allowed to resume control.

The signals arriving at the monitor units 35 and 36 from one of the computers 7 and 8 may agree with the signals arriving from the other computer to the extent that only a particular one of the lanes is functioning correctly. In such a case, only that lane is reconnected to the actuator 10 by signals from both monitor units 35 and 36 that cause the respective switches 23, 24 or alternatively, 25 and 26, to close.

The signals arriving at the monitor units 35 and 36 may be such that both check programs indicate that both lanes are functioning correctly. In this case, either a fault exists and it has not been identified, or the fault is an intermittent one. A fault that cannot be identified is assumed to exist in the control apparatus, and both lanes are left disconnected and the aircraft pilot is informed that the apparatus can no longer maintain control of the engine parameters.

The final possibility is that the signals reaching the monitor units 35 and 36 from the computers 7 and 8 are inconsistent, or that they indicate a fault in each of the lanes. In either of these events, both lanes are again left disconnected from the actuator 10, and this information is passed as a warning signal to the pilot who may override the monitor units 35 and 36 at his discretion. To assist the pilot in his decision making, the warning signal also indicates which of the two lanes is demanding the higher fuel flow to the engine.

The pilot can override the control apparatus and select which one of the lanes takes control by means of a manual selector switch 44 that operates on both monitor units 35 and 36 to close both switches 23 and 24 or, alternatively, both switches 25 and 26. Further selector override switches 45, 46 (FIG. 1) operate on the control units 15 and 19 respectively.

It is seen, therefore, that the pilot is dependent on the apparatus maintaining control of the engine only in the instances when either Lane I or alternatively Lane II is reconnected to the actuator 10. A situation in which a faulty lane is selected for control could only result from both check programs indicating the existance of a fault in a lane that has no fault in it, and not indicating a fault in the faulty lane. The probability of these two conditions occurring during the same fault-finding operation has been found statistically to be very low.

An alternative procedure once a fault has been detected in the control apparatus, is to leave a predetermined one of the lanes connected to the actuator whilst disconnecting the other lane. The check program is followed as already described, and control is only taken away from the chosen lane if that lane is found to be at fault. For example, it could be arranged that, with reference to the speed of the turbine shaft, detection of a fault in the control apparatus would leave in control that lane which indicates the higher turbine shaft speed. This choice would avoid an initial drop of power that might be obtained by choosing the lane indicating the lower turbine shaft speed, and furthermore, the turbine shaft speed would still be prevented from becoming dangerously high by a separate hydromechanical governor. In addition, it is preferable that a temporary mechanical limitation be introduced for the actuator 10, for example, to prevent excessive disturbance of fuel flow to the engine that could result in power surge, or in extinction of the combustion flame. Such a limitation would be removed either by manual action of the pilot, or, alternatively, after a predetermined time delay.

Control of the 'position' of the engine nozzle with the transducers 13 and 14, computers 7 and 8, and control unit 15, exercised by the actuator 16 that drives a motor (not shown) that adjust the effective area of the nozzle, is carried out analogously to the control already described by the fuel flow rate to the engine. Control of fuel flow to the afterburner is carried out in a similar manner with the transducers 17 and 18, computers 7 and 8, and control unit 19 operating the actuator 20 that adjusts the setting of a valve (not shown) in the fuel flow line to the afterburner.

The computer 7 and the monitor unit 35 have been considered as separate pieces of equipment, but it is envisaged that the logic circuitry of the monitor unit 35 could be incorporated into the computer 7, and that the computer 8 could incorporate the logic circuitry of the monitor unit 36.

It may be desirable in some other applications of the control system that the pilot's manual override switches, such as switches 44, 45 and 46, operate on more than one control unit to control more than one actuator.

The invention has been described with reference to mechanical components such as the motors 21 and 22 and the gearbox 27, but it is envisaged that some or all of the functions of these components may be carried out electrically, with corresponding electrical, as opposed to to mechanical, duplicity.

I claim:

1. Control apparatus comprising:

two inter-connected control lanes for providing nominally-identical outputs for control of an output parameter, each said control lane comprising computer means for deriving the control output of the subject lane, means for supplying a first signal in accordance with an input parameter to the said computer means, and means for supplying a second signal in accordance with a demanded value of said output parameter to said computer means, said computer means being programmed to perform a control program in which the value of the said first signal supplied in the subject lane is compared with the value of the said first signal supplied in the other lane to determine whether the two values are in accord with one another and to provide a derived value of the input parameter dependent upon the said two values if they are in accord with one another and otherwise to provide said derived value as the value of said first signal supplied in the subject lane, and said control program including computation of the said control output of the subject lane in dependence upon difference between the said derived value of the input parameter and the value corresponding to said second signal supplied to the computing means;

and means for detecting discrepancy between the control outputs of the two lanes to provide manifestation thereof.

2. Control apparatus according to claim 1 including actuator means operable to control said output parameter, signal-combining means having two inputs for operating said actuator means in accordance with the sum of any signals applied to said inputs, means for applying signals in accordance with the control outputs of the respective computer means of the two lanes to the two inputs of said signal-combining means, and disconnect means responsive to discrepancy between the two control outputs to interrupt the signal-supply to at least one of said inputs of the signal-combining means.

3. Control apparatus according to claim 2 wherein said disconnect means is responsive to discrepancy between the two control outputs to interrupt signal-supply to both inputs of the sum-deriving means.

4. Control apparatus according to claim 2 wherein said signal-combining means includes means to provide a manifestation of any difference between the said signals applied to said inputs, and wherein said disconnect means includes means responsive to said manifestation of difference to interrupt said signal-supply in the event the said manifestation exceeds a predetermined difference value.

5. Control apparatus comprising:

two inter-connected control lanes for providing nominally-identical outputs for control of an output parameter, each said control lane comprising computer means for deriving the control output of the subject lane, means for supplying a multiplicity of first signals in accordance with respective input parameters to the said computer means, and means for supplying a second signal in accordance with a demanded value of said output parameter to said computer means, said computer means being programmed to perform a control program in which the value of each said first signal supplied in the subject lane is compared with the value of the corresponding first signal supplied in the other lane to determine whether the two values are in accord with one another and to provide a derived value of the input parameter dependent upon the said two values if they are in accord with one another and otherwise to provide said derived value as the value of the said first signal supplied in the subject lane, said control program including computation of a multiplicity of control-output values of the subject lane each in dependence upon difference between the said derived value of each said input parameter and the value corresponding to said second signal supplied to the computing means, and said control program further including selection according to a predetermined criterion of one of said computed control-values to provide the said control output of the subject lane;

and means for detecting discrepancy between the control outputs of the two lanes to provide manifestation thereof.

6. Control apparatus according to claim 5 wherein the said programmed selection of one of said computed control-output values to provide said control output, is selection of whichever of those values corresponds to the lowest value of said output parameter.

7. Control apparatus according to claim 5 wherein the said derived value programmed to be provided in the event that the said two values are in accord with one another, is the mean of those two values.

8. Control apparatus comprising:

actuator means responsive to signals applied thereto to control an output parameter in accordance therewith;

two parallel-connected control lanes operative to provide nominally-identical output signals for control of the output parameter, each said lane including means for deriving the output signal of the subject lane, connection means operable to connect the subject lane, and thereby apply the derived output signal, to the said actuator means, and programmed means for performing a check program to determine the results of a multiplicity of checks on the functioning of the subject control lane;

two monitor means for operating the connection means in the two lanes to control thereby both the said connection to, and disconnection of the two lanes from, the actuator means, each said monitor means being programmed to perform a logic program to provide from the results of the checks performed by the said programmed means of the two lanes output identification of whichever of the two lanes is faulty, said logic program further including programmed comparison between the output identifications provided by the two monitor means to produce in the circumstances in which the two output identifications agree with one another, the condition in which the lane identified by these two output identificiations is disconnected from the said actuator and the other of the two lanes is connected to the said actuator, and in the circumstances in which the two output identifications disagree with one another the condition in which both lanes are disconnected from the said actuator;

and means that is manually operable for re-establishing connection of any said lane disconnected by the said monitor means.

* * * * *